United States Patent
Stellari et al.

(10) Patent No.: US 8,041,437 B2
(45) Date of Patent: Oct. 18, 2011

(54) SYSTEM AND METHOD FOR VIRTUAL CONTROL OF LABORATORY EQUIPMENT

(75) Inventors: Franco Stellari, Waldwick, NJ (US); Steven E. Steen, Peekskill, NY (US); Peilin Song, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 12/103,554

(22) Filed: Apr. 15, 2008

(65) Prior Publication Data

US 2009/0259321 A1    Oct. 15, 2009

(51) Int. Cl.
*G05B 19/18* (2006.01)

(52) U.S. Cl. .............. 700/65; 700/83; 715/771

(58) Field of Classification Search .......... 700/9, 15, 700/17, 65, 83; 340/3.1, 3.9; 715/706, 740, 715/744, 771, 773
See application file for complete search history.

(56) References Cited

U.S. PATENT DOCUMENTS

| | | |
|---|---|---|
| 5,103,110 A | 4/1992 | Housworth et al. |
| 5,805,442 A | 9/1998 | Crater et al. |
| 6,783,367 B1 | 8/2004 | Wang et al. |
| 6,792,321 B2 | 9/2004 | Sepe, Jr. |
| 6,813,473 B1 | 11/2004 | Bruker |
| 6,932,611 B2 | 8/2005 | Shen et al. |
| 6,954,904 B2 | 10/2005 | White |
| 2002/0147799 A1 | 10/2002 | Alhalabi et al. |
| 2004/0121299 A1 | 6/2004 | Rougeau et al. |

OTHER PUBLICATIONS

Nonis, Darren; "3D Virtual Learning Environments"; 2005; Educational Technology Dvision Ministru of Education; pp. 1-6.*

* cited by examiner

*Primary Examiner* — Albert Decady
*Assistant Examiner* — Chad Rapp
(74) *Attorney, Agent, or Firm* — F. Chau & Associates, LLC; Anne V. Doughterty, Esq.

(57) ABSTRACT

A system for virtual control of electronic laboratory equipment includes a local computer system. One or more items of electronic laboratory equipment are connected to the local computer system. Each item of electronic laboratory equipment has a physical control panel including one or more displays or controls. A virtual control panel generation unit generates a virtual control panel accessible from a remote computer system. The virtual control panel is substantially similar to the physical control panel in appearance. A command interpretation unit monitors interaction between the remote user and the virtual control panel and generates electronic laboratory equipment commands for exploiting the functionality of the electronic laboratory equipment.

22 Claims, 10 Drawing Sheets

SYSTEM AND METHOD FOR VIRTUAL CONTROL OF LABORATORY EQUIPMENT

BACKGROUND

1. Technical Field

The present disclosure relates to laboratory equipment and, more specifically, to a system and method for the virtual control of laboratory equipment.

2. Discussion of Related Art

Electronic laboratory equipment such as power supplies, signal generators, sensors, and the like are common fixtures in modern laboratories. Each piece of equipment may feature one or more display components and one or more control keys. Signal inputs and outputs of the equipment may be connected to various pieces of hardware to perform various tests.

As a laboratory might have a large number of such items of test equipment, the test equipment may be rack-mounted for efficient storage and use. When rack-mounted, the items of test equipment are stacked in a shelf-like configuration, with all display components and control keys located on the front face of the equipment. Input and output cable connectors may be located either on the front face or the back face of the equipment so as to remain accessible while mounted. Accordingly, a user may retain full access to all equipment functions even when the equipment is rack-mounted.

Figure 1:
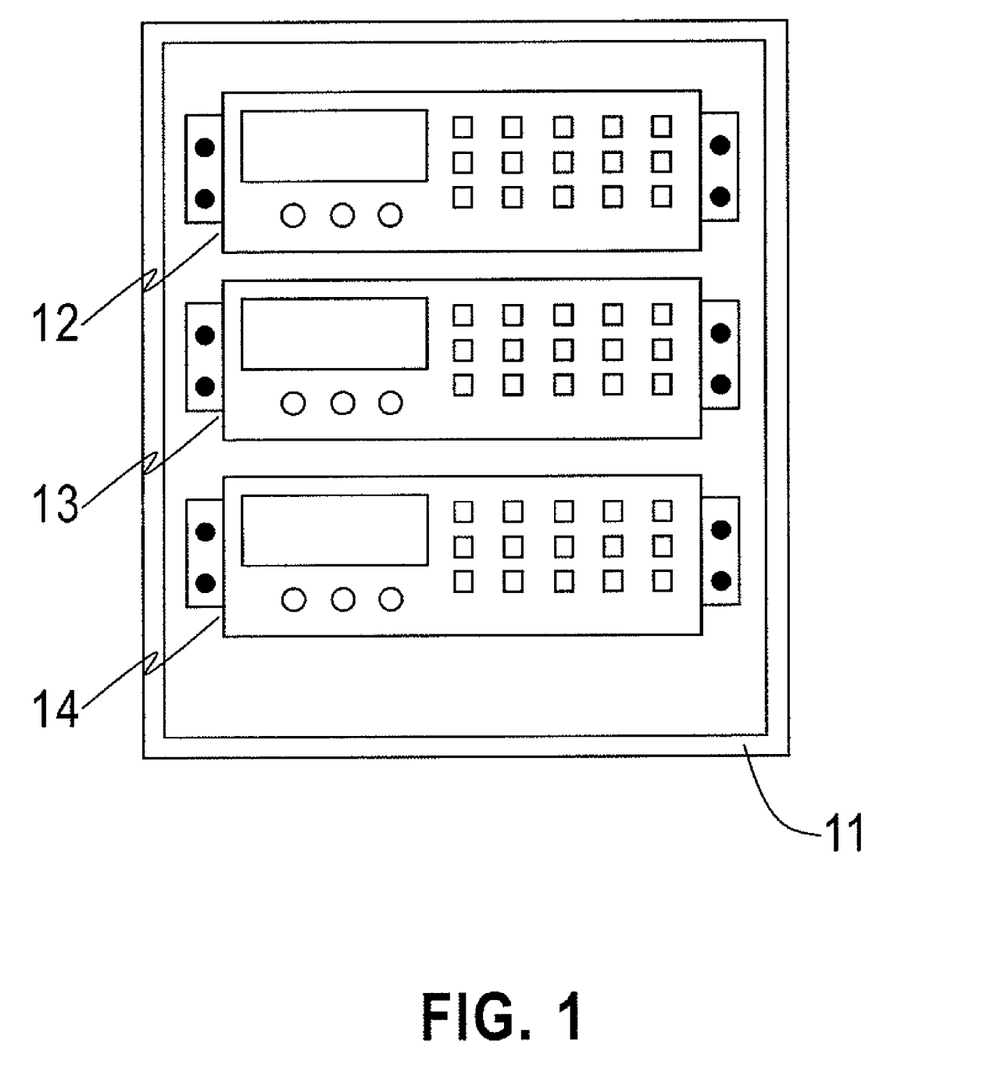
FIG. 1 is a schematic representation of a rack-mounting system.

FIG. 1 is a schematic representation of a rack-mounting system. Multiple items of equipment 12, 13 and 14 may all be mounted within a single rack 11 with the items stacked vertically and affixed to the rack 11 frame. Thus the front faces of each item of equipment 12, 13, and 14 may remain highly visible and accessible. A set of connecting cables may emerge from the back faces of each item of equipment 12, 13, and 14 and may be appropriately interconnected with each other and/or other laboratory hardware.

While the rack mounting system provides an effective approach for users to interact with the laboratory equipment, collaboration with remote users may be difficult as remote users lack the ability to interact with the display components and control keys of the laboratory equipment.

Most modern items of test equipment are configured with the ability to connect to a general-purpose computer system. For example, equipment may include a general purpose interface bus (GPIB) connector. This standard, as defined by IEEE-488, allows for the control of the equipment via the computer system. Other methods for connecting laboratory equipment to general purpose computers include small computer system interface (SCSI) and universal serial bus (USB) interfaces. Using these connectors and hardware drivers provided by the manufacturer of the equipment, computer programs may be written to allow the function of the equipment to be controlled by the computer system. The intended purpose of this arrangement is to use computer software to automate various testing and experimenting procedures so that the users are spared the repetitive and error prone task of configuring each item of test equipment each time it is used in a different capacity.

However, these connections to general-purpose computer systems are short-ranged and the problem of allowing for collaboration with remote users is not solved by the ability to control the laboratory equipment using local computer systems. As local computer systems may in turn be connected to a computer network, for example, across the Internet, it is possible for a remote user to control the functionality of the laboratory equipment by establishing a connection with the local computer system that is connected to the laboratory equipment and writing computer programs that make use of the various hardware drivers installed on the local computer. However, this process may be time consuming, tedious and may require programming skills on the part of the user.

SUMMARY

A system for virtual control of electronic laboratory equipment includes a local computer system. One or more items of electronic laboratory equipment are connected to the local computer system. Each item of electronic laboratory equipment has a physical control panel including one or more displays or controls. A virtual control panel generation unit generates a virtual control panel accessible from a remote computer system. The virtual control panel is substantially similar to the physical control panel in appearance. A command interpretation unit monitors interaction between the remote user and the virtual control panel and generates electronic laboratory equipment commands for exploiting the functionality of the electronic laboratory equipment.

A system for virtual control of electronic laboratory equipment in a virtual environment includes a local computer system executing a local client for interfacing with a virtual environment server. One or more items of electronic laboratory equipment are connected to the local computer system. Each item of electronic laboratory equipment has a physical control panel including one or more displays or controls. A server for managing a virtual environment includes a virtual space including virtual representations of the electronic laboratory equipment. Each item of electronic laboratory equipment includes a virtual control panel substantially similar in appearance to the corresponding physical control panel. A remote computer executes a remote client for interacting with the virtual environment server. A remote user interacts with the virtual representations of the electronic laboratory equipment in the virtual space of the virtual environment by controlling an avatar representing the remote user. The interactions between the avatar and the virtual representations of the electronic laboratory equipment are monitored and used to generate electronic laboratory equipment commands for exploiting the functionality of the electronic laboratory equipment.

A method for virtual control of electronic laboratory equipment includes displaying a virtual control panel on a remote computer system. The virtual control panel is substantially similar in appearance to a physical control panel of an item of electronic laboratory equipment. Interaction between a user of the remote computer system and the virtual control panel is monitored. Monitored interaction between a user of the remote computer system and the virtual control panel is converted into instructions for exploiting the functionality of the electronic laboratory equipment. The instructions for exploiting the functionality of the electronic laboratory equipment are sent to a local computer system connected to the electronic laboratory equipment over a computer network. Commands to the electronic laboratory equipment are issued from the local computer system based on the received instructions for exploiting functionality of the electronic laboratory equipment.

A method for virtual control of electronic laboratory equipment in a virtual environment includes controlling an avatar representing a remote user to interact with a virtual control panel of a virtual representation of an item of electronic laboratory equipment in a virtual space of a virtual environment. The virtual control panel is substantially similar in appearance to a physical control panel of an actual item of electronic laboratory equipment. Interaction between the avatar and the virtual control panel is monitored. Monitored interaction between the avatar and the virtual control panel is converted into instructions for exploiting functionality of the actual item of electronic laboratory equipment. The instructions for exploiting the functionality of the actual item of electronic laboratory equipment is sent to a local computer system connected to the actual item of electronic laboratory equipment over a computer network. Commands are issued to the electronic laboratory equipment from the local computer system based on the received instructions for exploiting the functionality of the electronic laboratory equipment.

BRIEF DESCRIPTION OF THE SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide a system and method for the remote control of laboratory equipment using an advanced user interface so that control of the laboratory equipment may be quick, efficient, simple, and does not require the user to possess computer programming skills. Accordingly, collaboration between local and remote users may be facilitated.

Figure 2:
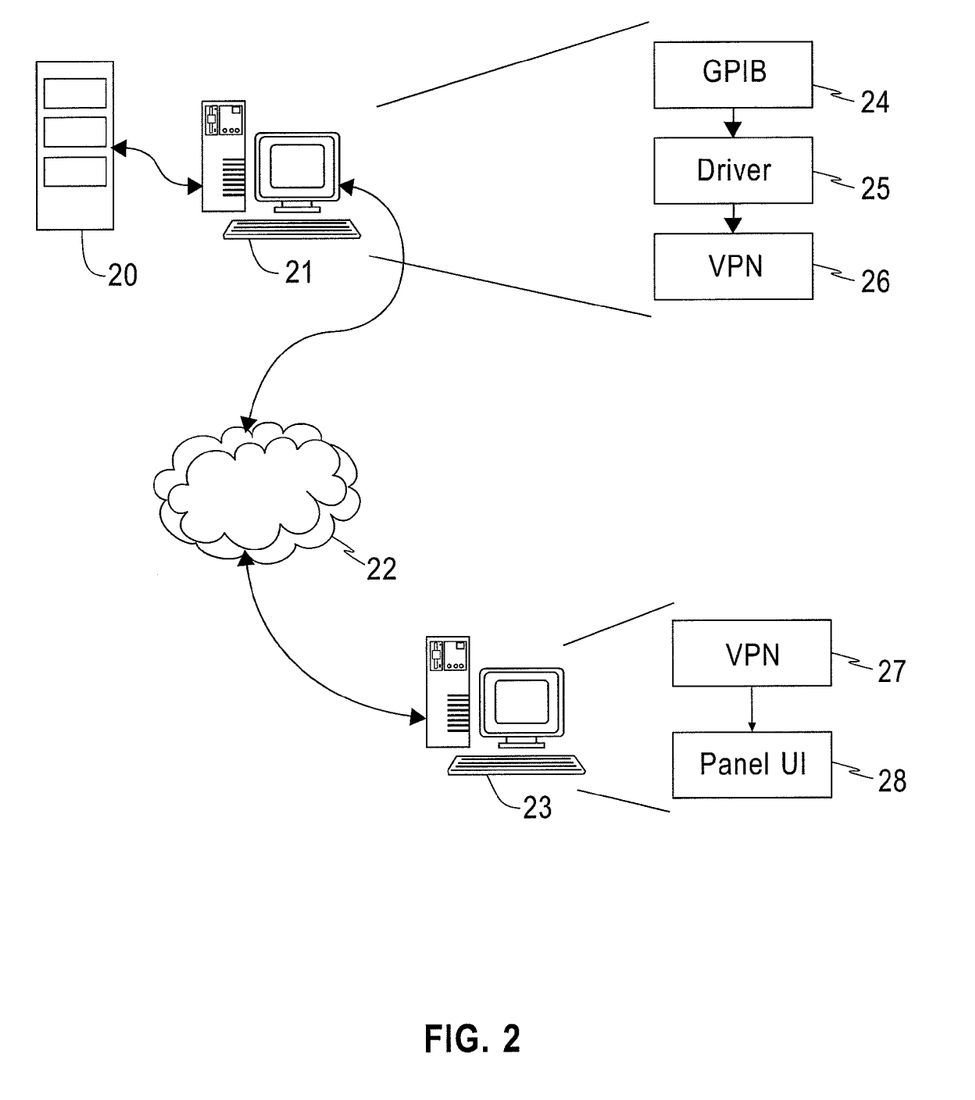
FIG. 2 is a schematic representation of a system for providing remote control of laboratory equipment according to an exemplary embodiment of the present invention.

FIG. 2 is a schematic representation of a system for providing remote control of laboratory equipment according to an exemplary embodiment of the present invention. Laboratory equipment 20 may be connected to a general purpose computer system 21 via a short-distance connection bus such as GPIB, SCSI and/or USB. The laboratory equipment 20 may be any set of electronic devices with displays and/or control keys. For example, the laboratory equipment 20 may include a set of rack-mounted hardware, which each item of hardware connected to the computer system 21. The computer system 21 may be a standard personal computer with an appropriate connection for connecting to the laboratory equipment 20. For example, the computer system may be equipped with a GPIB connector, for example, via a PCI expansion card.

The short-distance connection between the laboratory equipment 20 and the general purpose computer system 21 may allow for the sending of control signals to the laboratory equipment 20 and allow for the receiving of output from the laboratory equipment.

The computer system 21 may be connected to a computer network 22, for example an intranet or the Internet. The computer system 21 may execute software for performing one or more functions. The computer system 21 may execute software for communicating with the GPIB 24. This software may be embodied as a hardware driver, for example. The computer system 21 may also execute one or more hardware drivers for controlling the functions and interpreting the output of the laboratory equipment 20. There may be one driver for each piece of equipment or several pieces of equipment may share a common driver. Accordingly one or more drivers may be needed to effectively communicate with the laboratory equipment. The computer system 21 may also execute software 26 for communicating over the computer network 22 to another computer. This software 26 may include software for connecting to a virtual private network (VPN) or may include a client application for communicating with a remote server application over a virtualized environment, for example, as discussed in greater detail below.

Accordingly the computer system 21 may be in communication with a remote computer system 23 over the network 22. The connection may be a direct connection, for example, packets may be routed directly between the computer system 21 and the remote computer system 23 over the network 22 or both the computer system 21 and the remote computer system 23 may execute a client application for contacting a server application that is also connected to the network 22. In this case, the server application may manage the communication between the two computer systems 21 and 23, for example, using a web service or a virtualized environment, for example, as discussed in greater detail below.

Figure 3:
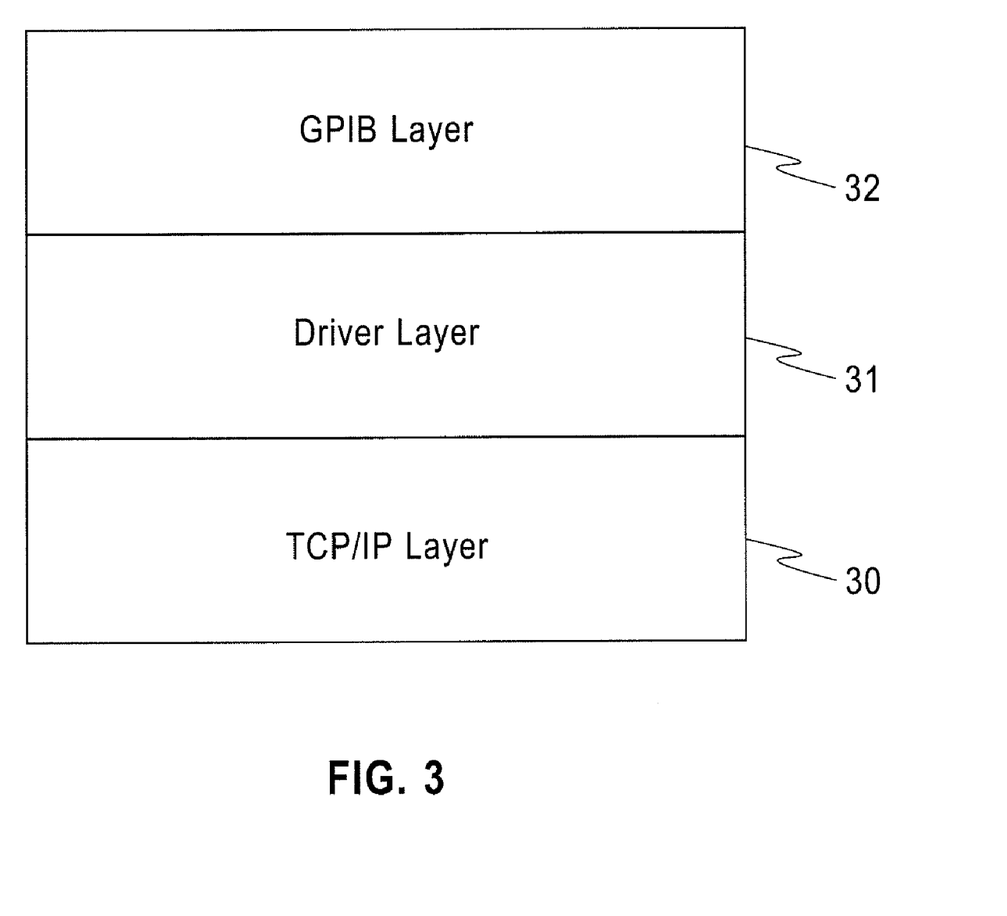
FIG. 3 is a diagram illustrating various software layers executed by a special-purpose digital device for connecting laboratory equipment to a computer network according to an exemplary embodiment of the present invention.

The computer system 21 need not be a general purpose computer system. Rather, the computer system 21 may be a special-purpose digital device designed to manage the direct control of the laboratory equipment 20 by the remote computer 23 over the computer network. Such a special-purpose digital device may include a network adapter port such as an Ethernet port or wireless network adapter, a port for connecting to the laboratory equipment, for example, a GPIB port, and a microprocessor for executing various software layers. FIG. 3 is a diagram illustrating various software layers executed by a special-purpose digital device for connecting laboratory equipment to a computer network according to an exemplary embodiment of the present invention. A TCP/IP layer 30 may be used to manage communication over the computer network by the sending and receiving of packets of data. The TCP/IP layer 30 may be able to interpret the packets of data and pass along the interpreted information to a driver layer 31. The driver layer 31 may then translate the data interpreted by the TCP/IP layer 30 into equipment control and output signals. The driver layer 31 may then send the equipment control and output signals to and from a GPIB layer 32 which manages communication with the laboratory equipment.

The remote computer system 23 may also be a general purpose computer system. A remote user may use the remote computer system 23 to interface with the computer system 21 across the network 22. The remote computer system 23 may execute software 27 for transferring data across the network 22. This software 27 may include software for connecting to a virtual private network (VPN) or may include a client application for communicating with a remote server application over a virtualized environment, for example, as discussed in greater detail below.

The remote computer system 23 may also execute user interface software 28 for presenting a virtual control laboratory equipment control panel to the remote user. Where both the computer system 21 and the remote computer system 23 communicate via a server over the virtual environment, the user interface software 28 may be executed on the server rather than on the remote computer system 23.

The user interface for presenting a virtual control laboratory equipment control panel to the remote user may present the remote user with a large arrangement of controls and displays that may be used to control the function of the laboratory equipment and to display output from the laboratory equipment such that the remote user is provided with an interface that retains the look and feel of the original laboratory equipment. For example, the user interface may present the controls and displays separately for each item of laboratory equipment. The user interface may thus create a virtual hardware rack where each item of laboratory equipment is presented as a distinct panel display. Thus there may be one panel display for each item of equipment being controlled. Each panel display may have an appearance that is substantially similar to the front panel of the actual item of laboratory equipment. The relative position of the panel displays may also correspond to the relative position of the laboratory equipment in its rack so that the remote user may achieve the sensation of actually being in close proximity to the laboratory equipment.

While the panel displays may include functionality that is not present on the actual front panel of the corresponding equipment, the general arrangement of virtual displays and virtual control keys on the panel displays may closely track the arrangement of actual displays and actual control keys on the front panel of the corresponding item of laboratory equipment.

Each panel display may be embodied in a separate window on the desktop of the remote computer system. Alternatively, each panel display may be embodied as a separate row within a single window. As discussed above, there may be one panel display provided for each item of laboratory equipment under control or there may be one panel display for controlling all items of laboratory equipment, for example, with a single row of the panel display dedicated to each item of laboratory equipment.

For example, where the items of laboratory equipment are power supplies, the panel display may include multiple rows, each of which corresponds to a single power supply under control. Each row may therefore include an address field indicating the GPIB address of that supply; a model name field indicating the model name of the supply; a channel field indicating the supply output channel for that supply; a label field for indicating a user-defined label that may allow the user to easily distinguish that supply; voltage and current settings fields for allowing the user to set the desired voltage and current; an OCP check box field for allowing the user to enable or disable over current protection (OCP) for that supply; an OVP field for allowing a user to set an over voltage protection (OVP) limit for that supply; an enable toggle switch allowing the user to enable or disable that supply; and voltage, current, and power readout fields for providing the user with a display of the actual voltage, current, and power being provided by that supply.

One or more controls and readouts may also be provided on the panel display for controlling all items of laboratory equipment simultaneously or for controlling parameters affecting the virtual display and control. For example, there may be an enable all toggle switch for enabling all supplies or disabling all supplies with one switch. There may be a reading toggle for allowing the user to activate or deactivate the reading of such properties as voltage, current, and power for display within the panel display.

The panel display may also include an options menu for controlling various other features. For example, the options menu may be used to change the order in which laboratory equipment is arranged within the display panel; select the rate at which voltage, current, and power readings are read, synchronize automatic readings, take a reading upon synchronization, enable read button during automatic readings; adjust confirmation box settings; activate measurement log; append date to log file name; clear log file with each use; and open log file for inspection.

Similarly, a file menu may be used to create a new profile, load a new profile, and save a profile. Each profile may represent an arrangement of the panel display including which control and display items are provided and how they are arranged.

Figure 4:
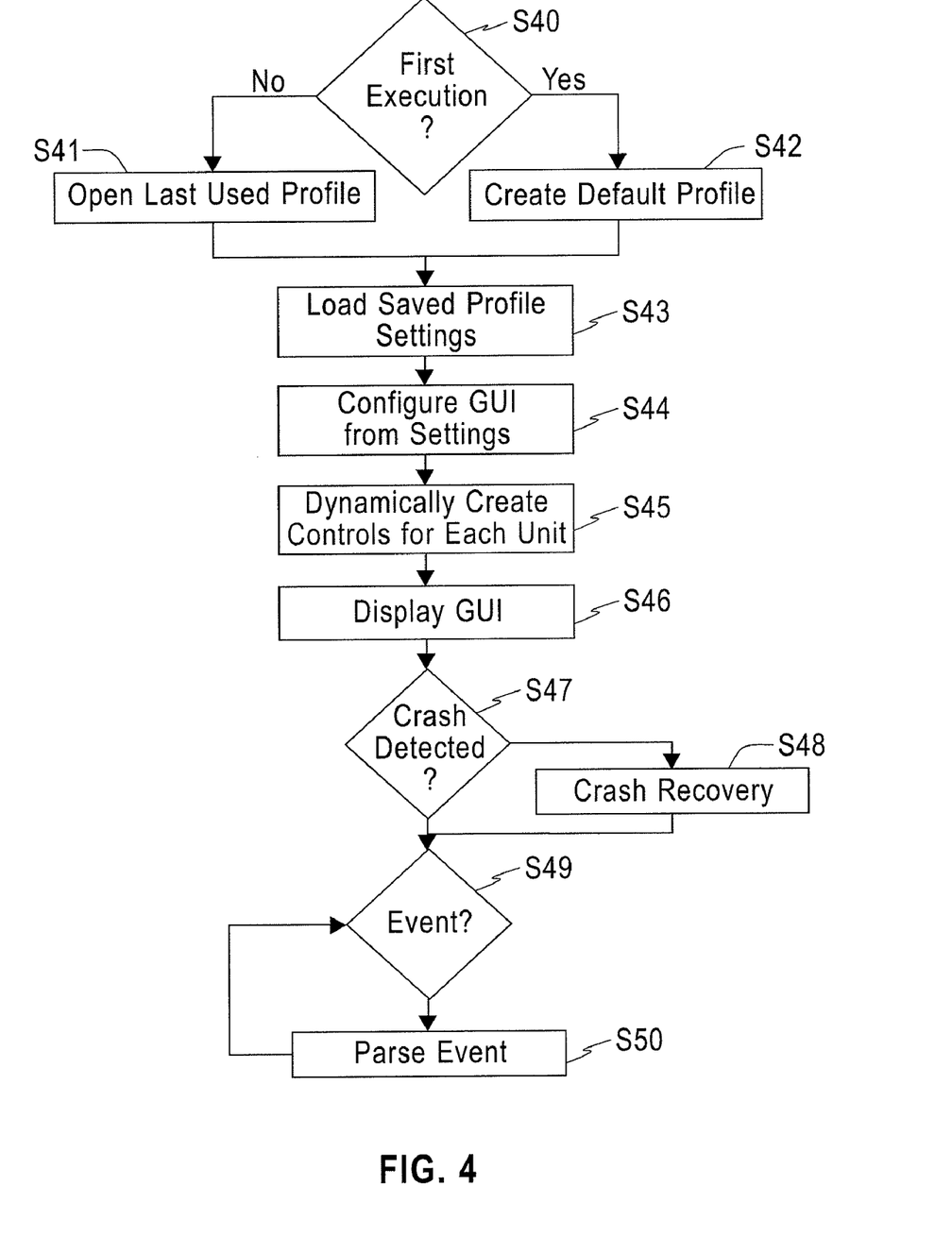
FIG. 4 is a flow chart illustrating a method of a virtual panel application according to an exemplary embodiment of the present invention.

The panel display may be generated by a virtual panel application that may be executed either on the remote computer or on a server accessed by the remote computer. The virtual panel application may generate the panel display and ensure proper panel display function. FIG. 4 is a flow chart illustrating a method of a virtual panel application according to an exemplary embodiment of the present invention.

It may be determined whether the virtual panel application is being executed for the first time (Step S40). If the virtual panel application is being executed for the first time (Yes, Step S40) then a new profile may be created according to default settings (Step S42). If, however, the virtual panel application has been previously executed (No, Step S40) then the last used profile may be opened (Step S41). Saved settings may be loaded from the opened/created profile (Strep S43). These settings may determine the layout of the display panel (s) to be created and any available options. For example, saved settings may include an order in which the items of test equipment are to be presented in the display panel. The graphic user interface (GUI) may then be configured based on the loaded settings (Step S44). The controls for each unit of test equipment may be dynamically created (Step S45). Creation of the controls may include determining what switches, input boxes, displays, menus, etc. are to be presented. The configured GUI may then be displayed (Step S46), for example, as one or more windows.

Operating systems and software applications used by general purpose computers may be subject to occasional software crashes and other unexpected terminations. Moreover, the network connection between the computer system and the remote computer system may occasionally fail. Accordingly, the possibility exists that the present state of one or more units of test equipment may be lost upon a software crash. Accordingly, each time a unit of test equipment is turned on, or another critical setting is changed, the status of the test equipment may be recorded to a configuration file. Then, as the virtual panel application is executed, it may be determined whether the software has experienced a crash (Step S47). The software may know that it has experienced a crash because upon re-execution, it may see that it was not properly shut down during the previous execution. If it is determined that a crash has occurred (Yes, Step S47) then crash recovery may be performed (Step S48). Crash recovery may include reading the configuration file to determine if any units of test equipment have been left powered on, and if it is discovered that units of test equipment have been left powered on, or other present conditions need to be addressed, the user may be prompted to shut down the test equipment left on or to take any other desired remedial steps.

In the event that no crash has occurred (No, Step S47) or after crash recovery has been performed (Step S48) then the program may enter an event loop. An event may be a user making a change to one or more of the displayed settings of the panel display. For example, the user may use the panel display to turn on a power supply. An event may also include the occurrence of a read update. In the event loop, it is determined whether an event has occurred (Step S49). When an event has occurred (Yes, Step S49), the event may be parsed (Step S50). Parsing of an event may include executing the instructions offered by the user. For example, where the event includes the user activating a power toggle for a unit of test equipment, commands for activating the unit of test equipment may be generated and transmitted to the test equipment via the network and the computer system. The event loop may continue until program execution is terminated.

As discussed above, an event may be a read request. A read request is a command sent to the unit of test equipment requesting that one or more key parameters be measured and sent back for display on the panel display. For example, where the item of test equipment is a power supply, the read request may be to read a present voltage, current and power being drawn from the power supply. Such an operation may be triggered either manually, for example, with a user selecting a read button on the panel display, or it may be triggered at preset intervals. Thus the event associated with a read request may either be triggered by user input or the passage of a predetermined length of time. A read enable switch may also be included on the display panel to enable or disable automatic reading at the preset intervals.

When automatic reading is enabled, the user may enter an options menu and set certain options pertaining to automatic reading. For example, an automatic reading rate may be set. This parameter reflects the frequency with which readings are automatically read. A timer may be used to determine when it is time to perform an automatic reading. The timer may be synchronized by the user when desired. The user may use this to synchronize the timer to some other event. The user may also select whether the first reading is to be taken immediately upon synchronization or if the first reading is to be taken after one full period after the synchronization has occurred. The user may also activate logging from the option menu. When logging is enabled, all readings may be recorded along with the time in which they were read. The recorded readings may be stored to a log file. The log file may be viewed and cleared from the option menu.

Each panel display may have one or more configuration profiles where settings and options may be stored. A profile may be created, loaded, modified, saved, and/or deleted as desired by the user. The configuration profile may describe a desired state of each unit of test equipment under control so a user need not manually configure each item when an existing profile will meet the needs of the user.

When the panel display is utilized to change settings of the laboratory equipment, either by the user manually changing settings or by loading a profile, the changes may be automatically interpreted into commands and the commands may be automatically sent to the laboratory equipment over the network. Alternatively, there may be an "output" button or toggle provided on the panel display whereby a user may select the "output" button or toggle the "output" switch to "on" in order to generate the appropriate command and have the command sent to the laboratory equipment. In implementing the desired user settings, the settings may be checked against a database of acceptable commands. Commands may be rated according to one of three categories: "no risk," "risk" and "not permitted." Where a command, or set of commands, to be sent fall into the "no risk" category, the commands may be sent to the laboratory equipment without issue. Where the command or set of commands fall into the "risk" category, the user may be presented with a dialog box asking to confirm the instructions and/or providing one or more reminders as to the nature of the risk involved with performing the desired commands. For example, if the user selects that a power supply be activated, this command may be interpreted as belonging to the "risk" category and the user may be presented with a dialog box saying "Caution: Please make sure cooling system is operating properly before activating this power supply." The user may then be presented with the option to continue or to abort the command.

Where the command is interpreted as belonging to the category "not permitted" the command may be automatically aborted and the user may be presented with a dialog box explaining the problem, for example, "Invalid Command: Command will not be executed." A particular set of commands may be not permitted if execution of the commands, given the present state of the laboratory equipment, is likely to damage the equipment or cause other problems.

A local user or administrative user may define what commands are not permitted. Because the panel display is utilized by a remote user, it is possible that particular commands are deemed not permitted because such commands should not be performed without a user present at the location of the laboratory equipment.

One or more command sequences may also be predefined. Predefined command sequences may be executed from the display panel either from an on-screen button or from a drop-down menu. An example of a command sequence would be to enable all units of laboratory equipment in a particular order. Another example of a command sequence would be to turn off all units of laboratory equipment. Performance of the predefined command sequence may be either fixed or variable. Fixed sequences will be performed in the same way without regard to parameters and user input. Variable command sequences may take into account parameters such as equipment status and/or user input. For example, when a power-off sequence is executed, the order in which each unit of equipment is powered off may depend on whether the user has previously selected top-down or bottom-up power down, for example, in the options menu.

Figure 5:
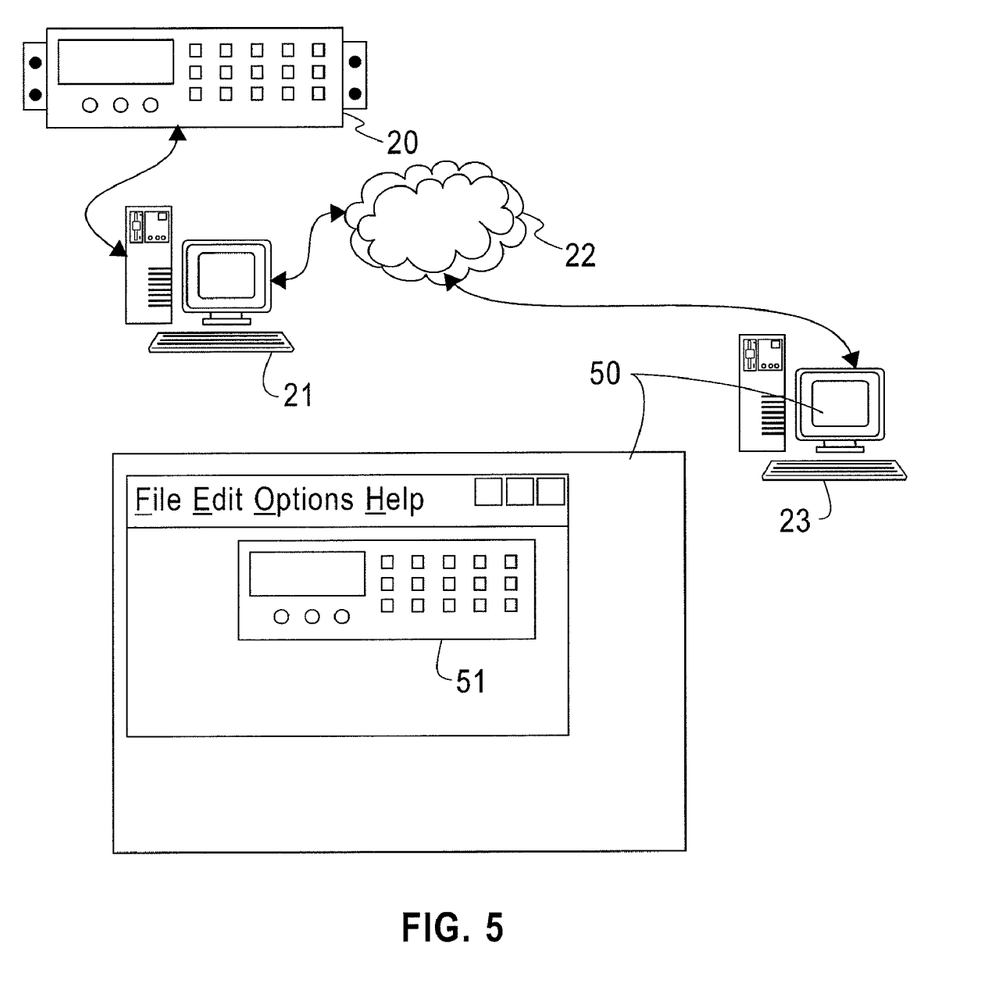
FIG. 5 is a schematic diagram illustrating laboratory equipment under control and corresponding display panels according to an exemplary embodiment of the present invention.

As discussed above, the layout of the display panel may be set to resemble the actual front panel of the controlled equipment. FIG. 5 is a schematic diagram illustrating laboratory equipment under control and corresponding display panels. The actual item of laboratory equipment 20, located in the laboratory, is connected to the local computer system 21, for example, via a GPIB connection. The local computer system communicates with a remote computer system 23 across the computer network 22. The display panel 51 may then be presented on the screen 50 of the remote computer 23. The display panel 51 may look substantially similar to the actual front panel of the controlled equipment, as shown.

Figure 6:
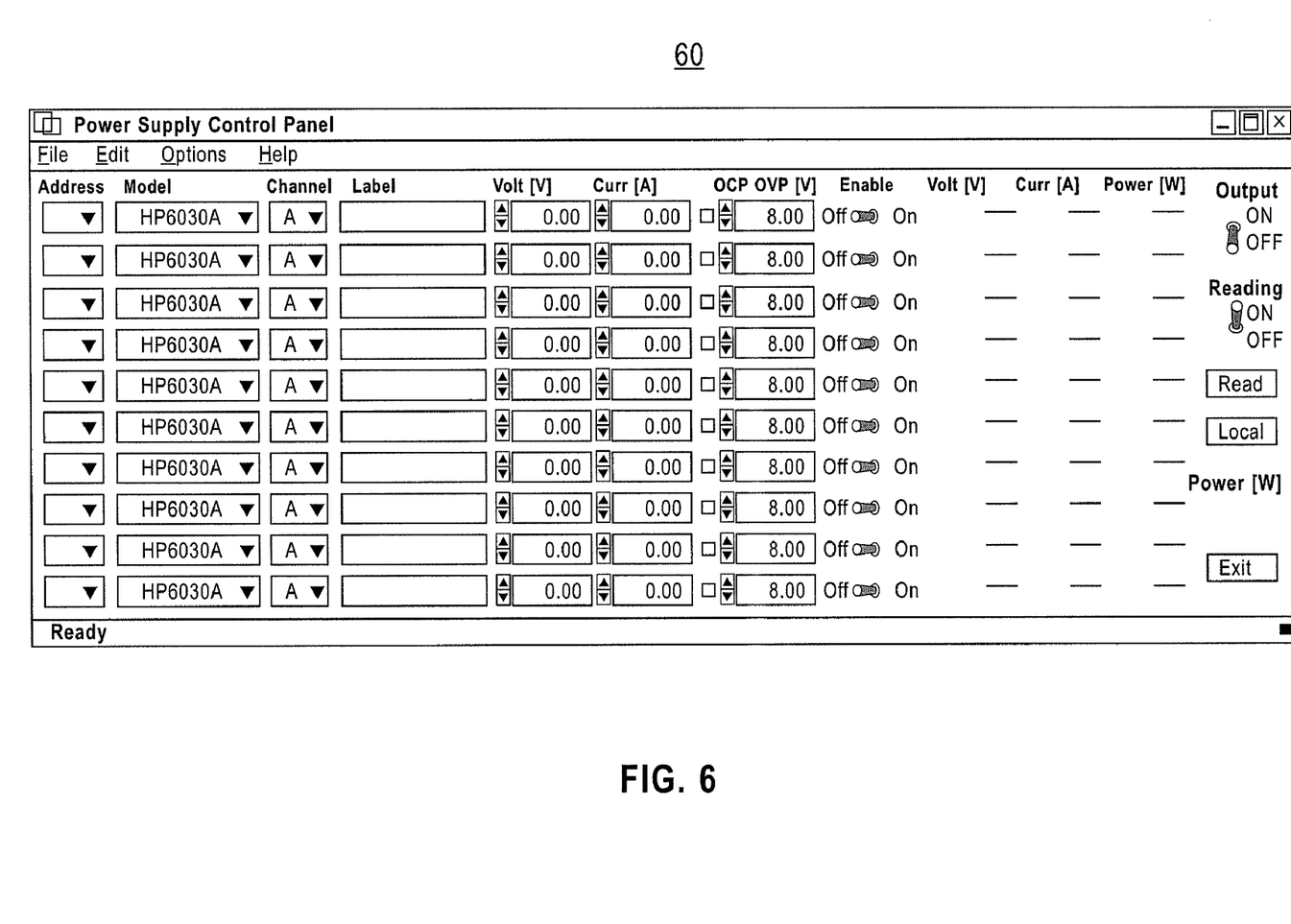
FIG. 6 is an example of a display panel with multiple items of laboratory equipment according to an exemplary embodiment of the present invention.

Alternatively, and for example, where there are multiple items of laboratory equipment under control, each item may appear as a row on a single display panel. FIG. 6 is an example of a display panel with multiple items of laboratory equipment according to an exemplary embodiment of the present invention. Here, there are ten rows representing ten items of laboratory equipment.

Figure 7:
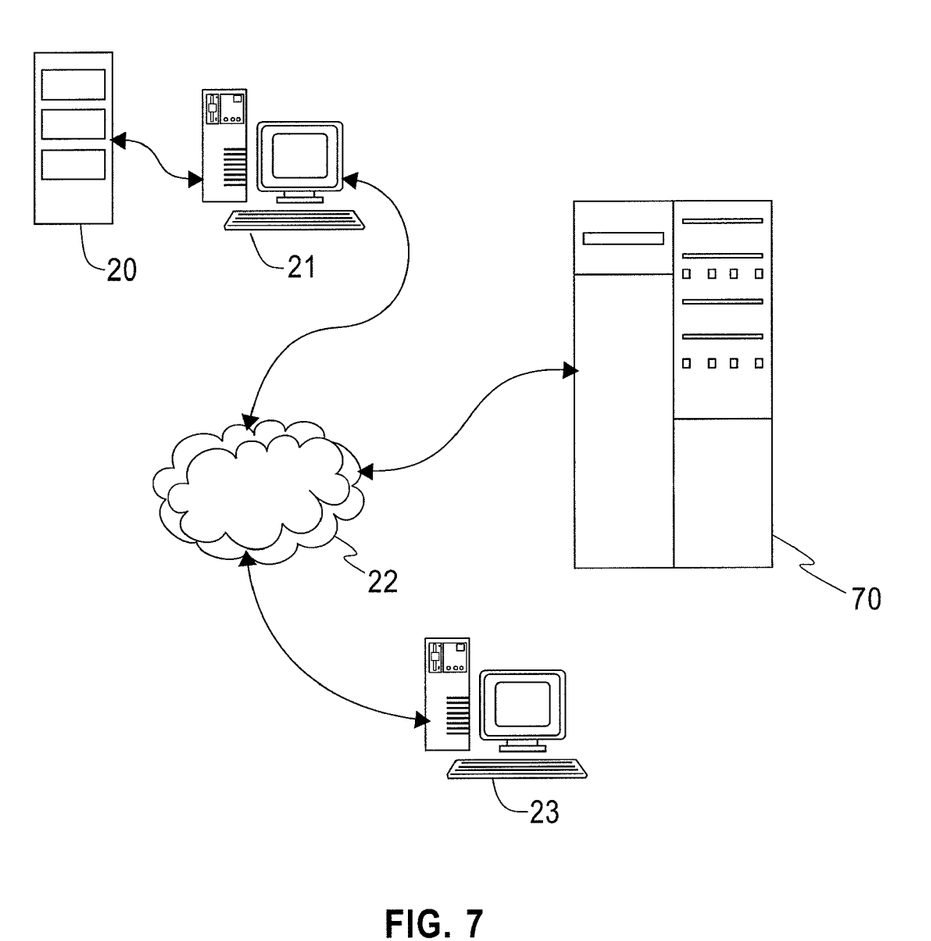
FIG. 7 is a diagram illustrating a system for providing remote control of laboratory equipment utilizing a client-server model according to an exemplary embodiment of the present invention.

As discussed above and illustrated in FIG. 2, communication between the local computer 21 and the remote computer 23 may be performed via a direct connection over the computer network 22. In such cases, generation of the display panel may be performed by an application executed on the remote computer 23. Alternatively, communication between the local computer 21 and the remote computer 23 may be managed by a server. FIG. 7 is a diagram illustrating a system for providing remote control of laboratory equipment utilizing a client-server model according to an exemplary embodiment of the present invention. Here, as described above, a local computer system 21 is in communication with a set of one or more items of laboratory test equipment 20. The local computer system 21 may be connected to a computer network 22, for example, an intranet or the Internet.

A remote computer system 23 may also be connected to the computer network 22. Here, a server 70 is also connected to the computer network. The server 70 may manage communication between the local computer 21 and the remote computer 23 and may also be responsible for generating the display panel. In this case, the remote computer 23 need only execute a client application, for example, a standard Internet browser. The server 70 may execute the generation of the display panel as part of one or more Web Services. For example, the server 70 may include multiple Web Services, a Web Service for generating the display panel, a Web Service for translating user input into commands, and a web service for transmitting commands to the local computer system 21. The server 70 may thus include multiple applications executed on one or more computer systems that may be distributed and/or redundant.

According to an exemplary embodiment of the present invention, the server 70 for generating the display panel may be executed within the special-purpose digital device designed to manage the direct control of the laboratory equipment described above. In such a case, the special-purpose digital device may manage communication with the laboratory equipment, generate one or more display panels, and permit the remote user to connect to the display panels over a standard web browser. These features may be performed within a singular device that may incorporate a computer system running a server-type operating system, for example, as a specialized version of Linux.

The server may be, for example, a virtual instrument software architecture (VISA) server. An example of a suitable VISA server is commercially available from National Instruments Corporation. The VISA server may be used to access local resources from a remote workstation. The VISA server may be executed on the local computer system and may allow the remote user to communicate with the laboratory equipment via the local computer system. The VISA server may thereby serve as an example of an approach to managing the connection between the local and remote computer systems.

As the VISA server is a low level interface, responsibility for generating the virtual display panel may be performed by another application, for example, an application executed on the local computer.

The server may also provide for additional communication between users located at the remote location and users located at the local location. For example, the server may manage instant messages, email communications, voice communication and/or video communication to enhance the ability of remote users to collaborate with local users. Where communication between users is managed by the server, the local and remote computer systems may each be equipped with appropriate peripheral hardware such as keyboards, speakers, microphones, video cameras, display devices, and the like.

The server may also provide an elaborate virtual environment where the remote user may interact with the laboratory equipment by controlling an avatar. In such cases, the user may control the avatar to interact with the display panel within the virtual environment and the interaction may be used to generate commands that are sent to the actual laboratory equipment, for example, as described above. Such exemplary embodiments of the present invention may be integrated with elaborate internet-based virtual worlds such as Second Life, developed and distributed by Linden Research, Inc. In such a setting, the site of the laboratory equipment may be represented within a virtual three-dimensional space and the remote user, by controlling an avatar, may interact with the representations of the laboratory equipment under control.

Figure 8:
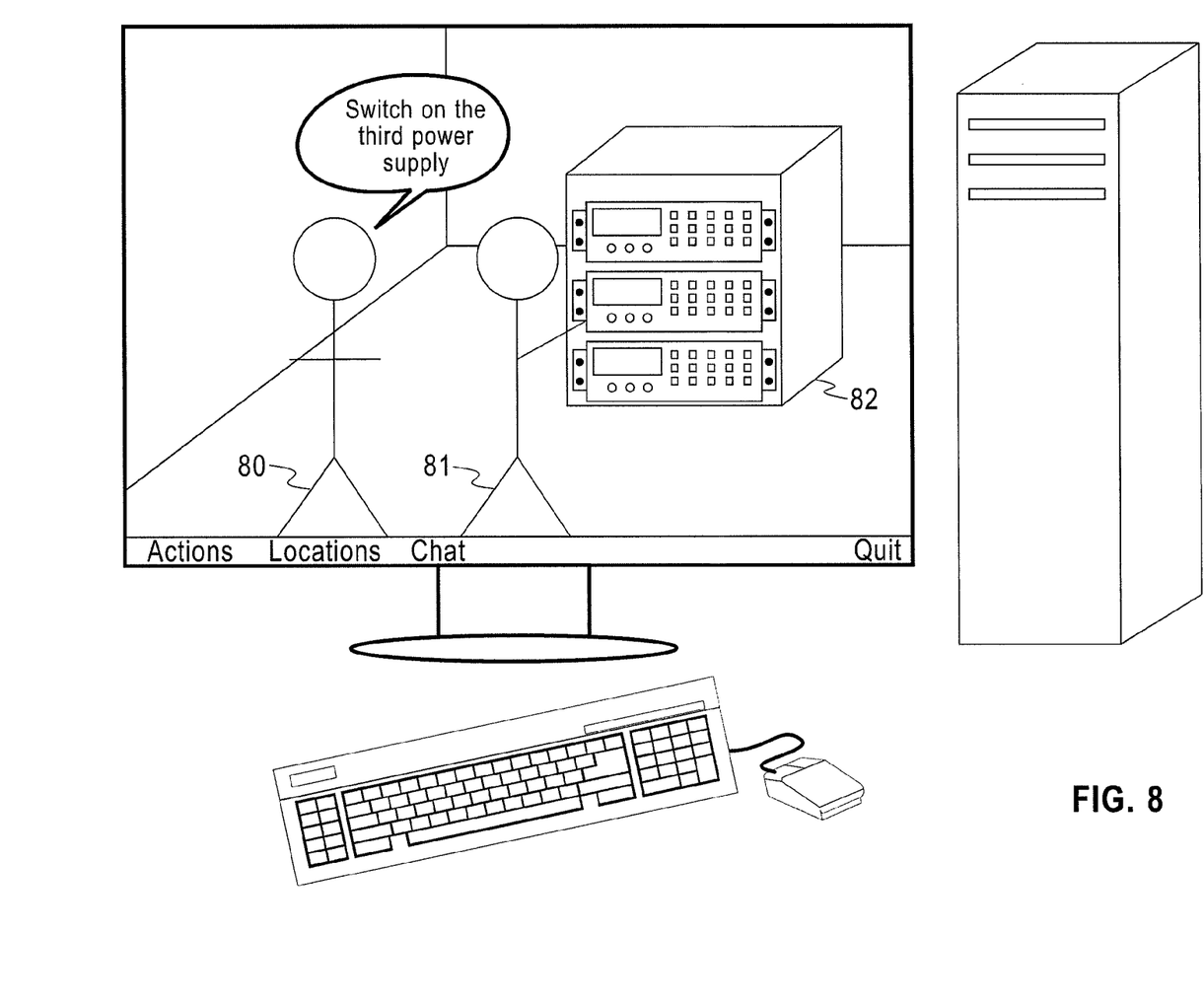
FIG. 8 is an illustration of a method for remote control of laboratory equipment over a virtual environment according to an exemplary embodiment of the present invention.

FIG. 8 is an illustration of a method for remote control of laboratory equipment within a virtual environment according to an exemplary embodiment of the present invention. The remote computer 23 may execute a client application for accessing the virtual environment, which is provided by one or more servers across the computer network, for example, the Internet. There may be more than one remote user accessing the virtual environment and each remote user may utilize a separate remote computer executing the client application.

The client application may include tools for using data received from the server to render a three-dimensional environment. The server may store information pertaining to the complete virtual environment and everything therein. The server may be embodied as a plurality of servers running on a plurality of computers. The plurality of servers may provide redundancy and load balancing and/or each server may store information pertaining to a section of the virtual environment.

Each user may have a corresponding avatar 80 and 81. The avatars may represent the users in the virtual environment. The movement of each avatar within the virtual environment may be managed by the server. A user may control the movements and actions of the avatar within the virtual environment by providing instructions to the client application. The user may also use the avatar to communicate with the avatars of other users, for example, using a text chat feature.

As each remote user may have a corresponding avatar that is free to move about in the virtual environment, it is possible for multiple remote users to enter the same location within the virtual environment and communicate with each other.

A virtual laboratory may be constructed within the virtual environment. The virtual laboratory may be programmed to represent equipment that is actually present in a real-world laboratory. Thus the virtual laboratory is not a fictional environment but rather a representation of an actual laboratory where multiple items of laboratory equipment that are present in the real-world laboratory. There may be a one-to-one correspondence between laboratory equipment present in the real-world laboratory and representations of laboratory equipment 82 within the virtual laboratory. Alternatively, the virtual laboratory may represent a subset of the equipment in the real-world laboratory.

As discussed above, the representation of laboratory equipment in the virtual environment may be modeled after the actual equipment and may include most or all of the controls and displays of the actual equipment.

Figure 9:
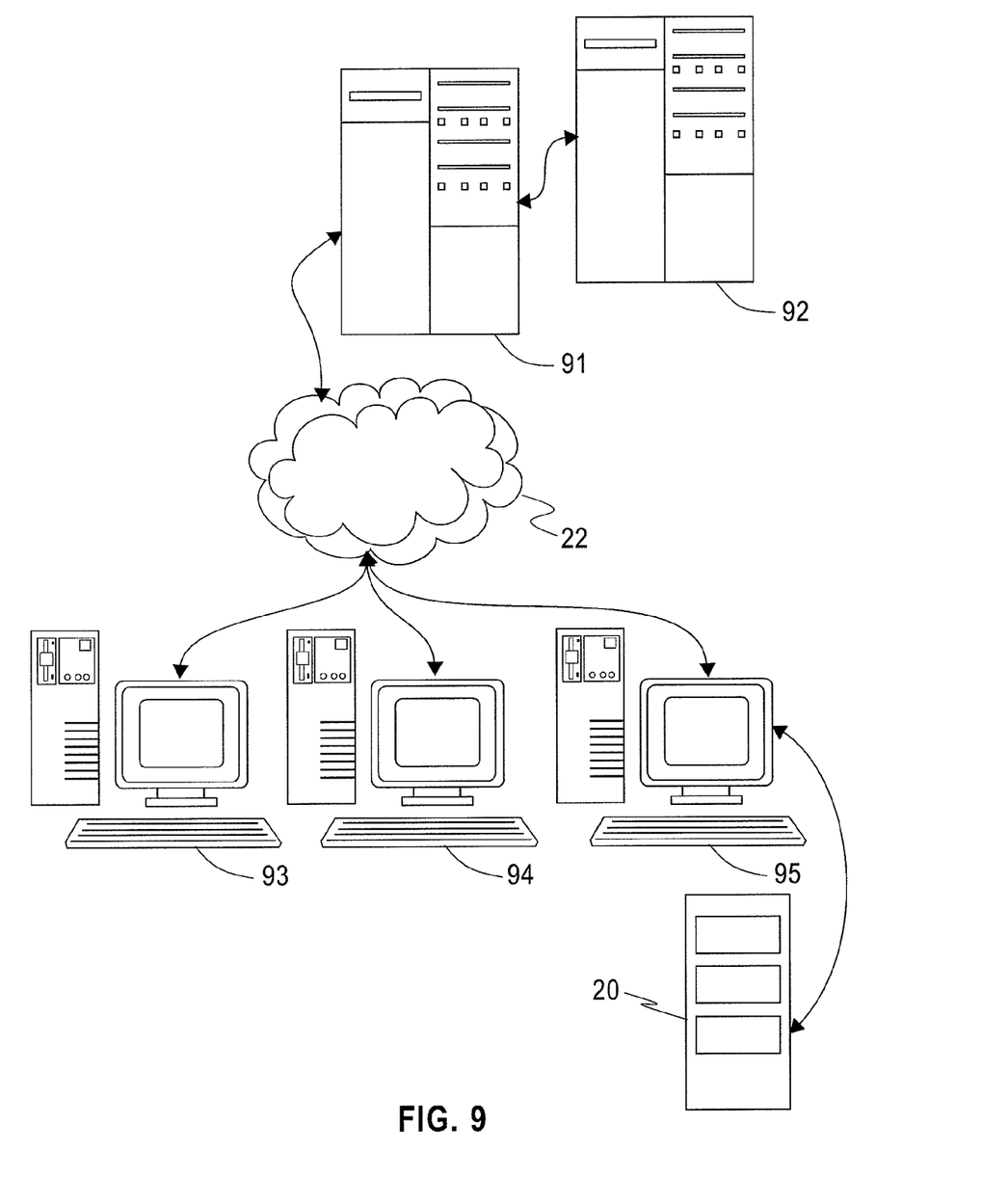
FIG. 9 is a diagram illustrating a system for remote control of laboratory equipment over a virtual environment according to an exemplary embodiment of the present invention.

FIG. 9 is a diagram illustrating a system for remote control of laboratory equipment over a virtual environment according to an exemplary embodiment of the present invention. A virtual environment server computer 91 may be connected to a computer network 22, for example, the Internet. The virtual environment server computer 91 may execute a server application for generating and managing a virtual environment. A local computer 95 may be located in a laboratory. The local computer 95 may be connected to a plurality of laboratory equipment 20, for example, over a GPIB connection. The local computer 95 may run a client application for interfacing with the virtual environment over the computer network 22. The client application may be capable of managing communications between the laboratory equipment 20 and the virtual environment running on the virtual environment server computer 91.

Within the virtual environment, a virtual laboratory may be constructed, for example, using tools made available by the virtual environment. The virtual laboratory may include representations of each item of laboratory equipment 20. A laboratory equipment interface server 92 may be in communication with the virtual environment server 91, either directly (as shown) or over the network 22. The virtual environment server 91 may manage the three-dimensional environment and the laboratory equipment interface server 92 may interpret interactions between avatars and the representations of laboratory equipment 82 and manage communication with the laboratory equipment 20 via the local computer 95. Alternatively, this interaction may be managed from the local computer 95.

One or more remote computers 93 and 94 may also execute client applications for accessing the virtual environment. A remote user may be located at each remote computer 93 and 94. There may be any number of remote users at corresponding remote computers. Each remote computer may be connected to the network 22. Each remote user may use the client application at their computer to generate an avatar with which to interact with the virtual environment. A user at the local computer 95 may also use an avatar to interact with the virtual environment and may thus have the opportunity to control the laboratory equipment 20 either directly or through the virtual environment. The local user may also be free to travel to a remote location and control the laboratory equipment 20 through the virtual environment. Accordingly, a local user engaged in experimentation may be free to leave the laboratory and still retain control over the experimentation. Exemplary embodiments of the present invention may thus allow for local and remote users to collaborate on experimentation over a virtual environment.

Figure 10:
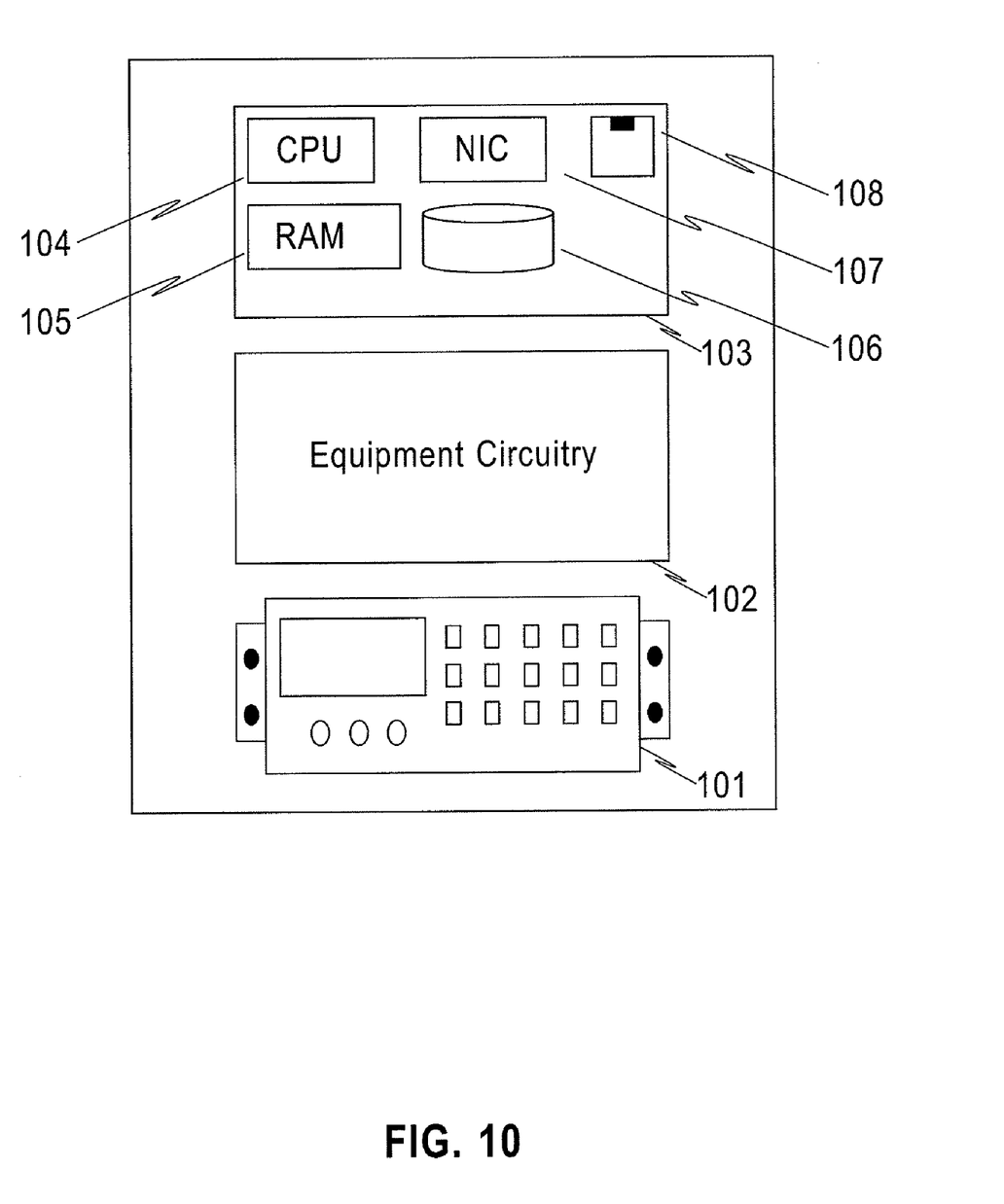
FIG. 10 is a diagram illustrating specialized laboratory equipment for interfacing with a virtual environment according to an exemplary embodiment of the present invention.

Specialized laboratory equipment may also be developed to interface with the virtual environment without the use of a local computer system. FIG. 10 is a diagram illustrating specialized laboratory equipment for interfacing with a virtual environment according to an exemplary embodiment of the present invention. The specialized laboratory equipment 100 may include a front panel 101, a back panel (not shown), and equipment circuitry 102. These features are the features that would ordinarily be present in a conventional item of laboratory equipment. The specialized laboratory equipment 100 may also include a virtual environment communications module 103. This module may include a CPU 104, RAM 105 and a storage device 106. The storage device may be either a hard disk drive or a solid state storage device, such as flash memory. The storage device may store a client application for accessing the virtual environment and a display panel profile for creating a virtual representation of the actual front panel 101 and/or any other controls or displays within the virtual environment. The programming stored on the storage device 106 may be updated as needed. The virtual environment communications module 103 may also include a network interface card 107 for communicating with the computer network via an Ethernet port 108 and/or a wireless network adapter (not shown).

Accordingly, the specialized laboratory equipment 100 may be used in the same manner as a conventional item of laboratory equipment, however the specialized laboratory equipment 100 may be directly connected to the Internet and may its self manage virtualization features as described above without the need of a general purpose computer system.

An example of a computer system which may implement a method and system of the present disclosure is described below. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system may include, for example, a central processing unit (CPU), random access memory (RAM), a printer interface, a display unit, a local area network (LAN) data transmission controller, a LAN interface, a network controller, an internal bus, and one or more input devices, for example, a keyboard, mouse etc. As shown, the system may be connected to a data storage device, for example, a hard disk, via a link.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A system for virtual control of electronic laboratory equipment, comprising:

a local computer system;

one or more items of electronic laboratory equipment connected to the local computer system, each item of electronic laboratory equipment having a physical control panel including one or more displays or controls;

a virtual control panel generation unit generating a virtual control panel accessible from a remote computer system, the virtual control panel being substantially similar to the physical control panel in appearance; and a command interpretation unit monitoring interaction between the remote user and the virtual control panel and generating electronic laboratory equipment commands for exploiting the functionality of the electronic laboratory equipment, wherein each of the one or more items of electronic laboratory equipment has a corresponding driver for controlling functions and interpreting output of the corresponding item of electronic laboratory equipment, and wherein the command interpretation unit characterizes instructions of the remote user for exploiting the functionality of the electronic laboratory equipment according to a level of risk and generates a dialog message of caution when the instructions are characterized as meeting or exceeding a predetermined level of risk.

2. The system of claim 1, wherein the local computer system is a general purpose computer system connected to the electronic laboratory equipment by a GPIB connection, a SCSI connection, or a USB connection.

3. The system of claim 1, wherein the laboratory equipment includes a power supply unit.

4. The system of claim 1, wherein the remote computer system is connected to the local computer system over a computer network.

5. The system of claim 4, wherein the computer network is the Internet.

6. The system of claim 4, wherein the virtual control panel generation unit is embodied in the remote computer system.

7. The system of claim 4, wherein the virtual control panel generation unit is embodied in a computer server connected to the computer network.

8. The system of claim 1, wherein the virtual control panel generation unit is embodied in the local computer system.

9. The system of claim 4, wherein the local computer system is embodied in a dedicated interface box that connects the one or more items of electronic laboratory equipment to the computer network.

10. The system of claim 1, wherein the virtual control panel includes a virtual representation of substantially all controls and displays of the physical control panel.

11. The system of claim 1, wherein the electronic laboratory equipment comprises the local computer system, the virtual control panel generation unit, and a network interface adapter connecting the electronic laboratory equipment to the computer network.

12. A system for virtual control of electronic laboratory equipment in a virtual environment, comprising:
  a local computer system executing a local client for interfacing with a virtual environment server;
  one or more items of electronic laboratory equipment connected to the local computer system, each item of electronic laboratory equipment having a physical control panel including one or more displays or controls;
  a server managing a virtual environment including a virtual space including virtual representations of the electronic laboratory equipment, each item of electronic laboratory equipment including a virtual control panel being substantially similar in appearance to the corresponding physical control panel; and
  a remote computer executing a remote client for interacting with the virtual environment server, wherein a remote user interacts with the virtual representations of the electronic laboratory equipment in the virtual space of the virtual environment by controlling an avatar representing the remote user, and wherein the interactions between the avatar and the virtual representations of the electronic laboratory equipment are monitored and used to generate electronic laboratory equipment commands for exploiting the functionality of the electronic laboratory equipment,
  wherein either the local computer system or the server is configured to record status of the one or more items of electronic laboratory equipment to a configuration file within a storage device each time a unit of the one or more items of electronic laboratory equipment is turned on or a setting thereof is changed, and
  wherein either the local computer system or the server is configured to characterizes interactions of the user in the virtual environment with the virtual representations of the electrical laboratory equipment for exploiting the functionality of the electronic laboratory equipment according to a level of risk and generates a dialog message of caution when the interactions are characterized as meeting or exceeding a predetermined level of risk.

13. The system of claim 12, wherein the local computer system is a general purpose computer system connected to the electronic laboratory equipment by a GPIB connection, a SCSI connection, or a USB connection.

14. The system of claim 12, wherein the local computer system, the server for managing the virtual environment and the remote computer system are connected over the Internet.

15. The system of claim 14, wherein the electronic laboratory equipment comprises the local computer system, and a network interface adapter for connecting the electronic laboratory equipment to the Internet.

16. The system of claim 14, wherein the local computer system is embodied in a dedicated interface box that connects the electronic laboratory equipment to the Internet.

17. The system of claim 12, wherein the virtual control panel includes a virtual representation of substantially all controls and displays of the physical control panel.

18. A method for virtual control of electronic laboratory equipment, comprising:
  displaying a virtual control panel on a remote computer system, the virtual control panel being substantially similar in appearance to a physical control panel of an item of electronic laboratory equipment;
  monitoring interaction between a user of the remote computer system and the virtual control panel;
  converting monitored interaction between a user of the remote computer system and the virtual control panel into instructions for exploiting the functionality of the electronic laboratory equipment;
  characterizing the instructions for exploiting the functionality of the electronic laboratory equipment as either no risk, risk, or not permitted;
  generating a dialog message of caution when the instructions for exploiting the functionality of the electronic laboratory equipment are characterized as risk; and
  sending the instructions for exploiting the functionality of the electronic laboratory equipment to a local computer system connected to the electronic laboratory equipment over a computer network and issuing commands to the electronic laboratory equipment from the local computer system based on the received instructions for exploiting functionality of the electronic laboratory equipment when the instructions for exploiting the functionality of the electronic laboratory equipment are not characterized as not permitted.

19. The method of claim 18, wherein the virtual control panel includes a virtual representation of substantially all controls and displays of the physical control panel.

20. A method for virtual control of electronic laboratory equipment in a virtual environment, comprising:
  controlling an avatar representing a remote user to interact with a plurality of virtual control panels of virtual representations of a plurality of items of electronic laboratory equipment in a virtual space of a virtual environment, each of the virtual control panels being substantially similar in appearance to a corresponding physical control panel of an actual item of electronic laboratory equipment;
  monitoring interaction between the avatar and the virtual control panels;

converting monitored interaction between the avatar and the virtual control panels into instructions for exploiting functionality of the actual item of electronic laboratory equipment;

sending the instructions for exploiting the functionality of the actual items of electronic laboratory equipment to a local computer system connected to the actual items of electronic laboratory equipment over a computer network;

characterizing the instructions for exploiting the functionality of the electronic laboratory equipment according to a level of risk;

generating a dialog message of caution when the instructions for exploiting the functionality of the electronic laboratory equipment are characterized as meeting or exceeding a predetermined level of risk; and issuing commands to the electronic laboratory equipment from the local computer system based on the received instructions for exploiting the functionality of the electronic laboratory equipment, wherein each of the plurality of items of electronic laboratory equipment has a corresponding driver for controlling functions and interpreting output of the corresponding item of electronic laboratory equipment.

21. The method of claim 20, wherein each of the virtual control panels includes a virtual representation of substantially all controls and displays of the corresponding physical control panel.

22. The method of claim 20, wherein the virtual space is a virtual representation of an actual laboratory where the actual items of electronic laboratory equipment is located.

* * * * *